United States Patent [19]

Wong

[11] Patent Number: 4,741,105

[45] Date of Patent: May 3, 1988

[54] COMBINED ENVELOPE OPENER AND PENCIL SHARPENER UNIT

[75] Inventor: Man K. Wong, Quarry Bay, Hong Kong

[73] Assignee: Wellmann Industrial Co. Ltd., Hong Kong

[21] Appl. No.: 6,663

[22] Filed: Jan. 23, 1987

[30] Foreign Application Priority Data

Sep. 19, 1986 [GB] United Kingdom ................ 8622650

[51] Int. Cl.[4] ............................................ B23B 1/00

[52] U.S. Cl. ....................................... 30/123; 7/160; 30/278; 30/453; 30/459; 30/DIG. 3

[58] Field of Search ..................... 30/2, 123, 278, 280, 30/408, 431, 439, 453–455, DIG. 3; 7/136, 160, 170

[56] References Cited

U.S. PATENT DOCUMENTS

| | | | |
|---|---|---|---|
| D. 114,629 | 5/1939 | Becker | 7/160 X |
| 131,904 | 10/1872 | Powell | 7/160 |
| 4,389,780 | 6/1983 | Ostroski et al. | 30/408 |
| 4,601,316 | 7/1986 | Verdi | 30/453 |

*Primary Examiner*—Douglas D. Watts
*Attorney, Agent, or Firm*—Kenyon & Kenyon

[57] ABSTRACT

A combined envelope opener and pencil sharpener unit has an envelope opener part (1) constructed to receive a letter envelope (5) for the like to be opened passed in a substantially horizontal plane therethrough and operable electrically to cut open an edge margin of the envelope (5) or the like in a directional substantially at rights angles to said plane during passage therethrough. The unit also includes a pencil sharpener part (2) constructed to receive a pencil or the like to be sharpened inserted substantially at right angles to said plane and operable electrically to sharpen the inserted end of the pencil.

10 Claims, 3 Drawing Sheets

COMBINED ENVELOPE OPENER AND PENCIL SHARPENER UNIT

Figure 1:
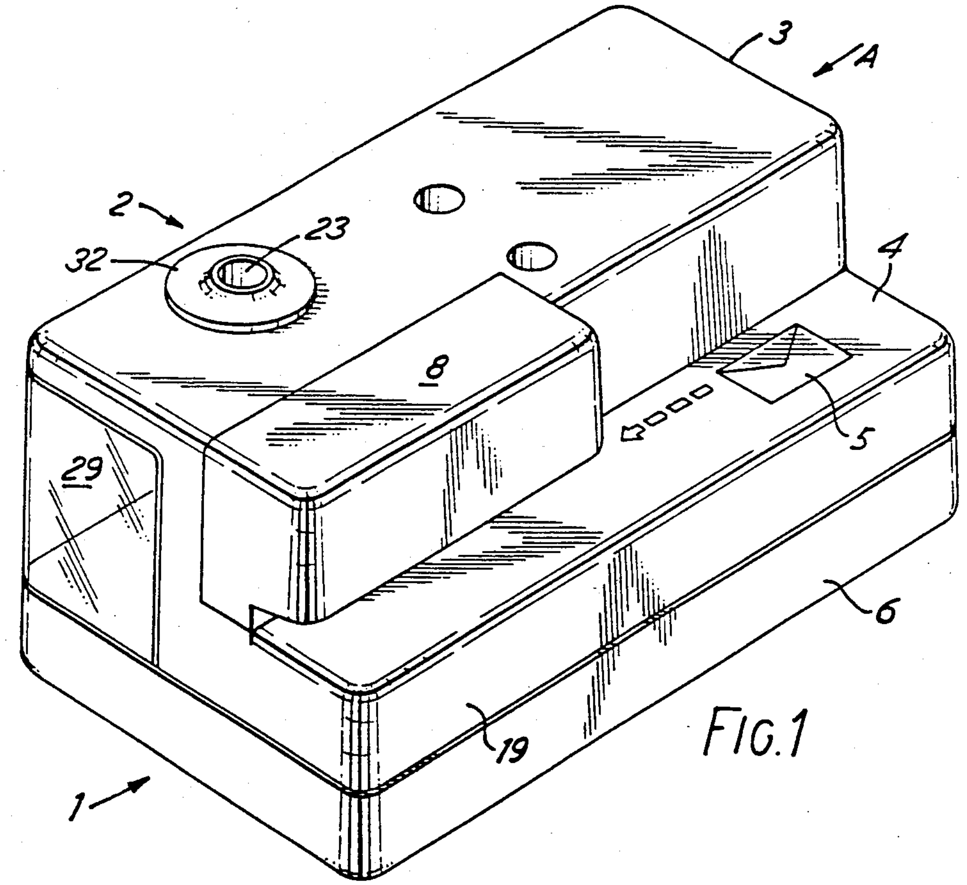

This invention relates to a combined envelope opener and pencil sharpener unit.

A combined envelope opener and pencil sharpener unit has previously been proposed in which envelopes to be opened are inserted in a plane parallel to the rotary axis of the pencil sharpener part of the unit. This produces the problem that waste material cut from the envelope can easily clog cutters of the envelope opener part of the unit with subsequent jamming thereof and difficulty in clearing the jam and the accumulated material previously cut from opened envelopes. Additionally such a previously proposed combined envelope opener and pencil sharpener unit does not provide satisfactory safety for a user in that it is possible for the pencil sharpener part of the unit to be opened during rotatin of the pencil sharpener with subsequent danger of damage to the user's fingers. Moreover with such a previously proposed unit it is difficult to extract pencil shavings from the pencil sharpener part of the unit and from the unit itself.

There is thus a need for a generally improved combined envelope opener and pencil sharpener unit which obviates or minimises the foregoing problems.

According to the present invention there is provided a combined envelope opener and pencil sharpener unit having an envelope opener part constructed to receive a letter envelope or the like to be opened passed in a substantially horizontal plane therethrough and operable from a source of electrical power to cut open an edge margin of the envelope or the like in a direction substantially at right angles to said plane during passage therethrough, and a pencil sharpener part constructed to receive a pencil or the like to be sharpened inserted substantially at right angles to said plane and operable from a source of electrical power to sharpen the inserted end of the pencil or the like.

Preferably the unit includes an elongated substantially rectangular body housing the envelope opener part and the pencil sharpener part, with one longitudinal side of the body being cut away in a stepped configuration to provide a substantially horizontal slide surface on which an envelope to be opened may be passed in a substantially horizontal plane through a cutter portion of the envelope opener part.

Conveniently the cutter portion is in the form of a pair of rotary cutter blades located in axially spaced partially overlapping array to rotate in planes substantially perpendicular to the plane of said slide surface, so that in operation the envelope edge margin to be opened passes between the two overlapping blades substantially at right angles thereto and is cut thereby.

Advantageously the two cutter blades are circular with one thereof located substantially below said slide surface with a cutting edge portion projecting through an aperture in said slide surface proud of said surface and with the other of said cutter blades located above said slide surface under a safety hood removably attachable to the body to project over said slide surface and shield the cutter blades from an operators fingers.

Preferably the envelope opener part includes a swing lever housed under said safety hood before the safety cutters, which swing lever is pivotably displaceable against a spring return bias, from a rest position in which it depends substantially vertical to said slide surface before the cutter blades, on contact by an envelope to be opened when passed along the slide surface towards the cutter blades, into an operative position in which it lies at an acute angle to said slide surface to close a contact switch and thereby complete an electrical circuit between a source of electrical power and a drive motor for the cutter blades, whereby the cutter blades are rotated only whilst the envelope is being passed therethrough, with the swing lever returning under the spring return bias to it's rest position when the envelope has passed through the cutter blades and out of contact with the swing lever.

Conveniently the source of electrical power is one or more batteries removably housable in said body, the cutter blades are rotatably drivable from said drive motor via a transmission gear assembly, and the slide surface carrying portion of the body is replaceably removable therefrom to afford access to an area in the body acting as a receiver for waste material cut from envelopes during opening thereof by the cutter blades.

Advantageously the pencil sharpener part includes in the body a substantially cylindrical cutter member having helically extending cutting edges there around and located at an actute angle to the longitudinal axis of a pencil to be sharpened when entered substantially vertically into the body into engagement with the cutter member edges via an entrance opening in an upper surface of the body, said longitudinal axis of the pencil when entered as aforesaid, being substantially perpendicular to the plane of said slide surface.

Preferably the cutter member is rotatable about it's own longitudinal axis and at an acute angle to and about the longitudinal axis of a pencil being sharpened by means of the envelope opener drive motor from which is drivable via a further transmission gear assembly.

Conveniently a first safety switch is provided in the vicinity of the entrance opening for displacement by an inserted pencil against a spring return bias from an off position in which it prevents passage of electrical power to the drive motor into an operative position in which it allows passage of electrical power to the drive motor and hence rotation of the cutter member whilst held open by the presence of a pencil in the entrance opening, removal of the pencil from the entrance opening allowing return of the first safety switch under it's spring return bias into the off position, to prevent rotation of the cutter member.

Advantageously the pencil sharpener part includes an access hatch removably attachable to the longitudinal side of the body remote from the longitudinal side thereof providing the slide surface, to afford access to an area in the body acting to receive shavings from the pencil cutter member, and also includes a second safety switch displaceable by the attached access hatch against a spring return bias into an operative position in which it allows passage of electrical power to the drive motor of the cutter member, and returnable under it's spring bias, when the access hatch is removed from the body, into an off position in which it prevents passage of electrical power to the drive motor and hence prevents rotation of the cutter member whilst the access hatch is removed from the body.

Figure 2:
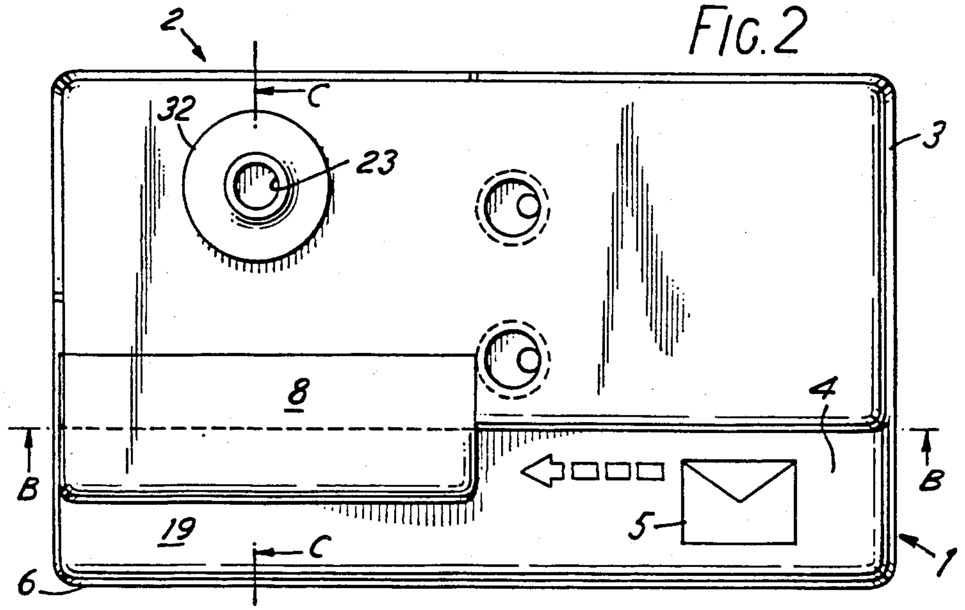
Figure 3:
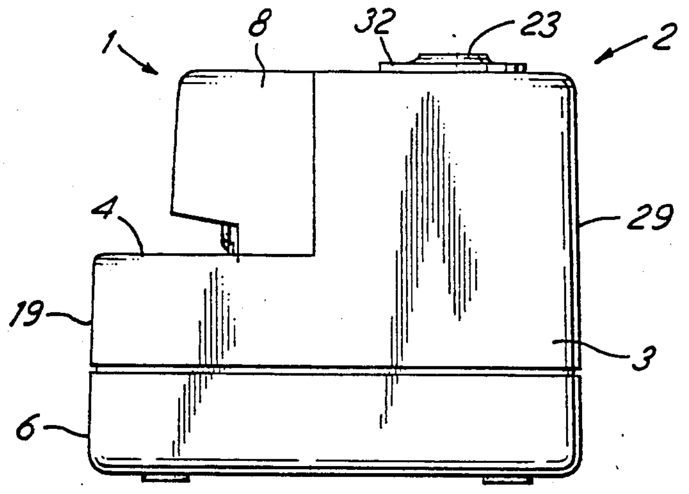
Figure 4:
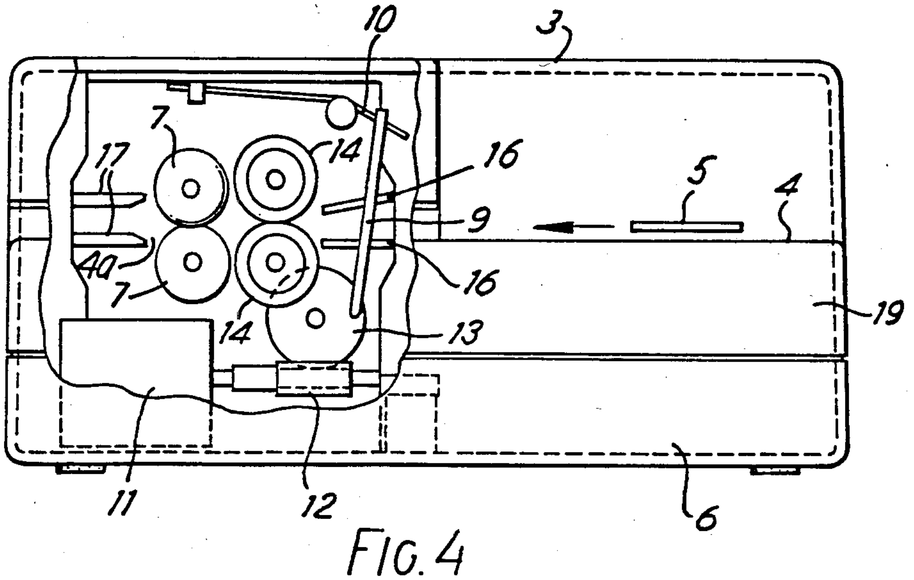
Figure 5:
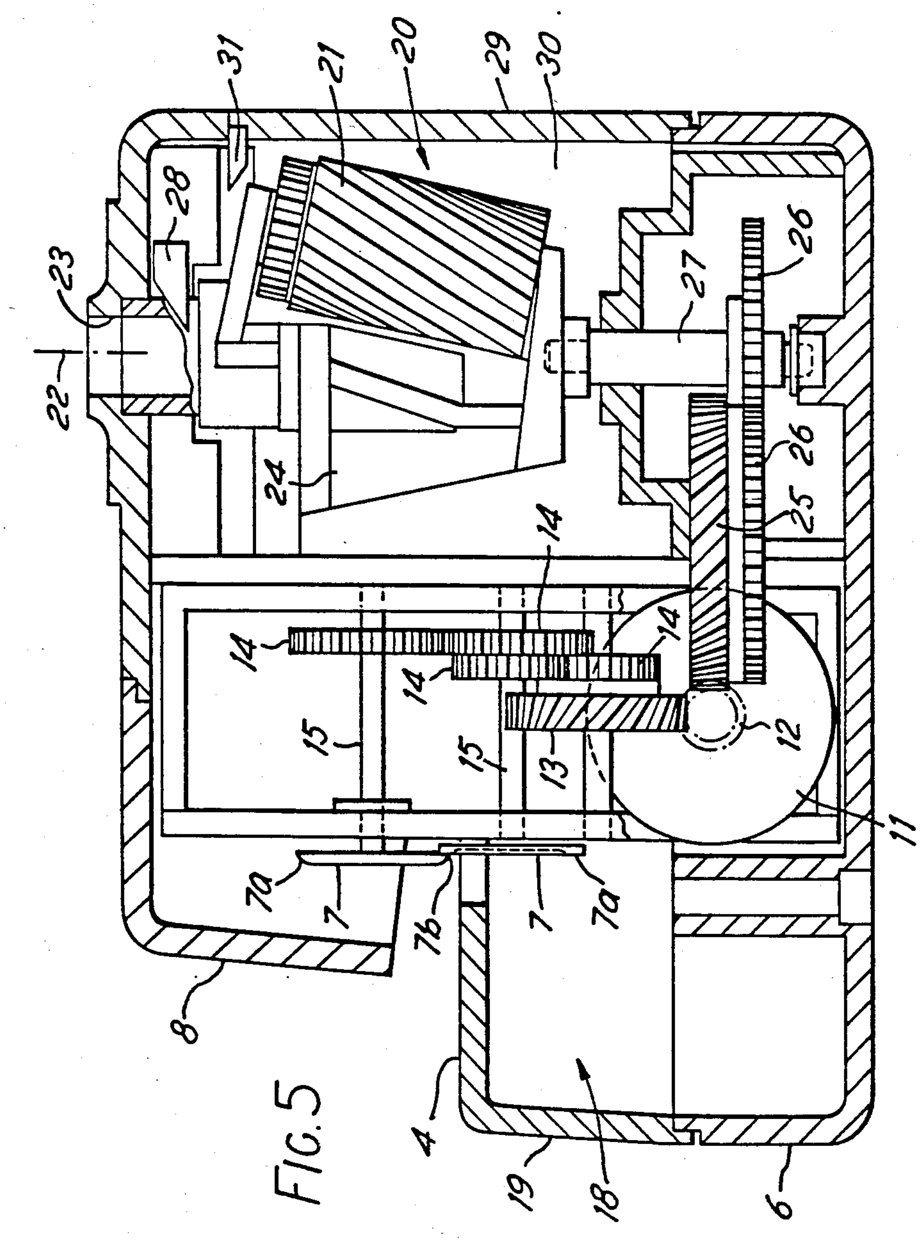

For a better understanding of the present invention, and to show how the same may be carried into effect, reference will now be made, by way of example, to the accompanying drawings, in which:

FIG. 1 is a perspective view from the front of a combined envelope opener and pencil sharpener unit according to a first embodiment of the invention, FIG. 2 is a plan view from above of the unit of FIG. 1, FIG. 3 is an end view taken in the direction of the arrow A in FIG. 1, FIG. 4 is a longitudinal vertical cross-sectional view through the unit of FIG. 1 taken along the line B—B in FIG. 2, and FIG. 5 is a transverse vertical cross-sectional view of the unit of FIGS. 1 to 4 taken along the line C—C in FIG. 2.

A combined envelope opener and pencil sharpener unit according to a first embodiment of the invention as illustrated in the accompanying drawings, has an envelope opener part generally indicated at 1 and a pencil sharpener part generally indicated at 2, both housed in an elongated substantially rectangular body 3 made of any convenient material such as sheet metal or plastics. The envelope opener part 1 is constructed to receive a letter envelope or the like to be opened passed in a substantially horizontal plane therethrough on a slide surface 4 and operable from a source of electrical power such as one or more electrical storage batteries (not shown) removably houeable in the body 3, to cut open an edge margin of the envelope or the like in a direction substantially at right angles to said plane during passage therethrough. A schematic illustration of an envelope on the slide surface 4 is shown at 5 in FIGS. 1, 2 and 4. The pencil sharpener part 2 is constructed to receive a pencil or the like (not shown) to be sharpened inserted substantially at right angles to the horizontal plane of the slide surface 4 and operable from a source of electrical power such as the aforesaid storage batteries, to sharpen the inserted end of the pencil or the like.

To provide the slide surface 4 one longitudinal side 6 of the body 3 is cut away in a stepped configuration as can be seen from FIGS. 1, 3 and 5. An envelope 5 to be opened may be passed in a substantially horizontal plane through a cutter portion of the envelope opener part 1.

To this end the cutter portion is in the form of a pair of rotary cutter blades 7 which are preferably circular disc like blades with cutting edge portions 7*a* as shown in FIG. 5 The cutter blades 7 are located in axially spaced partially overlapping aray to rotate in plane substantially perpendicular to the plane of the slide surface 4, so that in operation the envelope edge margin to be opened passes between the two overlapping blades at the mouth 7*b* thereof substantially at right angles thereto and is cut thereby.

As can be seen from FIG. 5 in particular the two cutter blades 7 are arranged with one blade 7 located substantially below the slide surface 4 with it's cutting edge portion 7*a* projecting through an aperture 4*a* proud of the surface 4. The other cutter blade 7 is located above the slide surface 4 under a safety hood 8 removably attachable to the body 3 to project over the slide surface 4 and shield the cutter blade 7 from an operators fingers.

The envelope opener part 1 also includes a swing lever 9, shown in FIG. 4, housed under the safety hood 8 before the cutter blades 7 in the direction of movement of the envelope 5 to be cut. This swing lever 9 is pivotally displaceable against a spring return bias provided by a leaf spring 10, from a rest position, as shown in FIG. 4, in which it depends substantially vertical to the surface 4 before the cutter blades 7, on contact by an envelope 5 to be opened when passed along the surface 4 towards the cutter blades 7, into an operative position (not shown) in which it lies at an acute angle to the surface 4, to close a contact switch (not shown) and thereby complete an electrical circuit between a source of electrical power such as the aforementioned batteries and an electrical drive motor 11 for the cutter blades 7. In this way the cutter blades 7 are rotated only whilst the envelope 5 is being passed through the blades 7 with the swing lever 9 returning under the spring return bias of the spring 10 to it's rest position of the spring 10 to it's rest position when the envelope 5 has passed through the cutter blades 7 and out of contact with the swing lever 9. This provides for effective and safe action of the envelope opener part 1.

The cutter blades 7 are rotatably drivable from the drive motor 11 via a transmission gear assembly incorporating a worm 12 attached to a drive shaft of the motor 11, in mesh with a worm gear 13 which drives, via meshing gears 14 shafts 15 on the outermost ends of which are fixedly mounted the cutter blades 7 and thus the cutter blades 7 are caused to rotate. As can be seen in FIG. 4 a pair of spaced inlet guides 16 may be provided for leading the envelope 5 into the mouth 7*b* of the cutter blade 7 and a pair of exit guides 17 may be provided for leading the opened envelope out of the envelope opener part 1. These guides also act as safety means preventing access of an operator's fingers to the cutter blades 7 whilst the safety hood 8 is attached to the body 3. Of course this safety hood 8 is removable from the body 3 to afford access to the cutter blades 7 to clear, if necessary, any waste cut material from the mouth 7*b* thereof to avoid jamming of the cutter blades. However little jamming, if any, is likely to occur in practice because, by virtue of the design of the unit, waste cut material can fall from the cutter blades 7 through the aperture 4*a* in the surface 4 into an area 18 in the body 3 acting as a receiver for the cut waste material. To afford access to this area 18 for removal of accumulated cut waste material the portion 19 carrying the slide surface 4 is replaceably removable from the longitudinal side 6 of the body 3. Conveniently, if necessary, the base portion of the body 3 carrying the side 6 may be made of transparent, preferably plastics, material so that the level of waste cut material in the area 18 is readily visible to an operator from the exterior of the unit.

The pencil sharpener part 2 of the unit includes, in the body 3, a substantially cylindrical cutter member 20 having helically extending cutting edges 21 there around. This cutter member 21 is located at an acute angle to the longitudinal axis 22 of a pencil to be sharpened when entered substantially vertically into the body 3 into engagement with the cutter member 20 via an entrance opening 23 in an upper surface of the body 3. The longitudinal axis 22 is substantially perpendicular to the plane of the slide surface 4. This has the effect of further separating operation of the two parts of the unit and thus improves the operting safety of the unit.

The cutter member 20 is rotatable about it's own longitudinal axis and at an acute angle to and about the longitudinal axis 22 by means of the drive motor 11 from which it is drivable via a further transmission gear assembly. Guide means 24 are provided to hold and guide the end of a pencil inserted in the entrance opening 23 towards and into contact with the cutter member 20 in conventional manner. The further transmission gear assembly includes a worm gear 25 in mesh with the worm 12 on the shaft from the drive motor 11 which in turn drives via meshing gears 26 and shaft 27 the cutter member 20 and guide means 24.

A first safety switch 28 is provided in the vicinity of the entrance opening 23 for displacement by an inserted pencil against a spring return bias from an off position, as shown in FIG. 5, in which it prevents passage of electrical power to the drive motor 11, into an operative position, not shown, in which it allows passage of electrical power to the drive motor 11 and hence rotary operation of the cutter member 20 whilst held open by the pressure of a pencil in the entrance opening 23. Removal of the pencil from the entrance opening 23 allows return of the first safety switch 28 under it's spring return bias into the off position as shown in FIG. 5 to prevent rotation of the cutter member whilst no pencil is in the pencil sharpener part 2 of the unit.

The pencil sharpener part 2 also includes an access hatch 29, preferbly made of transparent plastics material, removably attachable to the longitudinal side of the body 3 remote from the longitudinal side 6. This hatch 29 affords access to an area 30 in the body 3 acting to receive shavings from the pencil cutter member 20. By making the access hatch 29 transparent the operator can readily view the level of shavings in the area 30 from outside the unit for appropriate action to be taken to empty the shavings in good time.

In order to prevent the operator removing the hatch 29 and putting a finger in the moving cutter member 20 the pencil sharpener part 2 also includes a second safety switch 31 displaceable by the attached access hatch 29 against a spring return bias into an operative position, as shown in FIG. 5, in which is allows passage of electrical power to the drive motor 11 for the cutter member 20. The second safety switch 31 is returnable under it's spring bias action when the access hatch 29 is removed from the body, into an off position (not shown) in which it prevents passage of electrical power to the drive motor 11 and hence prevents rotation of the cutter member 20 whilst the access hatch 29 is separate from the body 3. Of course both safety switches 23 and 31 are interlocked so that operation of any one to the off position will prevent rotation of the cutter member 20.

As a further visual feature part of the body surface surrounding the entrance opening 23 may be made transparent as shown at 32 in FIG. 1 to allow operation of the pencil sharpener part to be checked visually from outside the unit.

I claim:

1. A combined envelope opener and pencil sharpener unit having an envelope opener part constructed to receive a letter envelope or the like to be opened passed in a substantially horizontal plane therethrough and operable from a source of electrical power to cut open an edge margin of the envelope or the like in a direction substantially at right angles to said plane during passage therethrough, and a pencil sharpener part constructed to receive a pencil or the like to be sharpened inserted substantially at right angles to said plane and operable from a source of electrical power to sharpen the inserted end of the pencil or the like.

2. A unit according to claim 1 including an elongated substantially rectangular body housing the envelope opener part and pencil sharpener part, with one longitudinal side of the body being cut away in a stepped configuration to provide a substantially horizontal slide surface on which an envelope to be opened may be passed in a substantially horizontal plane through a cutter portion of the envelope opener part.

3. A unit according to claim 2, wherein the cutter portion is in the form of a pair of rotary cutter blades located in axially spaced partially overlapping aray to rotate in plane substantially perpendicular to the plane of said slide surface, so that in operation the envelope edge margin to be opened passes between the two overlapping blades substantially at right angles thereto and is cut thereby.

4. A unit according to claim 3, wherein the two cutter blades are circular with one thereof located substantially below said slide surface with a cutting edge portion projection through an aperture in said slide surface proud of said surface and with the other of said cutter blades located above said slide surface under a safety hood removably attachable to the body to project over said slide surface and shield the cutter blades from an operator's fingers.

5. A unit according to claim 4, wherein the envelope opener part includes a swing lever housed under said safety hood before the cutter blades, which swing lever is pivotally displaceable against a spring return bias, from a rest position in which it depends substantially vertical to said slide surface before the cutter blades, on contact by an envelope to be opened when passed along the slide surface towards the cutter blades, into an operative position in which it lies at an actute angle to said slide surface to close a contact switch and thereby complete an electrical circuit between a source of electrical power and a drive motor for the cutter blades, whereby the cutter blades are rotated only whilst the envelope is being passed therethrough, with the swing lever returning under the spring return bias to it's rest position when the envelope has passed through the cutter blades and out of contact with the swing lever.

6. A unit according to claim 5, wherein the source of electric power is one or more batteries removably houseable in said body, and wherein the cutter blades are rotatably drivable from said drive motor via a transmission gear assembly, and wherein the slide surface carrying portion of the body is replaceably removable therefrom to afford access to an area in the body acting as a receiver for waste material cut from envelopes during opening thereof by the cutter blades.

7. A unit according to claim 6, wherein the pencil sharpener part includes in the body, a substantially cylindrical cutter member having helically extending cutting edges therearound the located at an actute angle to the longitudinal axis of a pencil to be sharpened when entered substantially vertically into the body into engagement with the cutter member edges via an entrance opening in an upper surface of the body, said longitudinal axis of the pencil when entered as aforesaid being substantially perpendicular to the plane of said slide surface.

8. A unit according to claim 7, wherein the cutter member is rotatable about it's own longitudinal axis and at an acute angle to and about the longitudinal axis of a pencil being sharpened by means of the envelope opener part drive motor from which it is drivable via a further transmission gear assembly.

9. A unit according to claim 8, wherein a first safety switch is provided in the vicinity of the entrance opening for displacement by an inserted pencil against a spring return bias from an off position in which it prevents passage of electrical power to the drive motor into an operative position in which it allows passage of electrical power to the drive motor and hence rotary operation of the cutter member whilst held open by the presence of a pencil in the entrance opening, removal of the pencil from the entrance opening allowing return of the first safety switch under it's spring return bias into the off position to prevent rotation of the cutter member.

10. A unit according to claim 9, wherein the pencil sharpener part includes an access hatch removably attachable to the longitudinal side of the body remote from the longitudinal side thereof providing the slide surface, to afford access to an area in the body acting to receive shavings from the pencil cutter member, and also includes a second safety switch displaceable by the attached access hatch against a spring return bias into an operative position in which it allows passage of electrical power to the drive motor of the cutter member, and returnable under it's spring bias, when the access hatch is removed from the body, into an off position in which it prevents passage of electrical power to the drive motor and hence prevents rotation of the cutter member whilst the access hatch is removed from the body.

* * * * *